US006483248B2

(12) United States Patent
Nagakubo et al.

(10) Patent No.: US 6,483,248 B2
(45) Date of Patent: Nov. 19, 2002

(54) DISPLAY DEVICE

(75) Inventors: Tetsuro Nagakubo, Yamanashi (JP);
Tetsuya Shigeta, Yamanashi (JP);
Hirofumi Honda, Yamanashi (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/870,678

(22) Filed: Jun. 1, 2001

(65) Prior Publication Data

US 2002/0036603 A1 Mar. 28, 2002

(30) Foreign Application Priority Data

Jun. 5, 2000 (JP) ........................................ 2000-168068

(51) Int. Cl.[7] .............................. G09G 3/10; G09G 3/28
(52) U.S. Cl. ...................................... 315/169.3; 345/60
(58) Field of Search ........................... 315/169.3, 169.4;
345/60, 64, 537, 538, 74, 76; 348/358, 459, 911

(56) References Cited

U.S. PATENT DOCUMENTS 6,034,482 A * 3/2000 Kanazawa et al. ........ 315/169.4
6,115,011 A * 9/2000 Sana et al. ..................... 345/64
6,151,075 A * 11/2000 Shin et al. .................. 348/459
6,154,257 A * 11/2000 Honda et al. ............... 348/558
6,329,759 B1 * 12/2001 Tanaka et al. ........... 315/169.3
6,369,516 B1 * 4/2002 Iketsu et al. ............. 315/169.3
6,388,678 B1 * 5/2002 Kasahara et al. ........... 345/693

* cited by examiner

*Primary Examiner*—Don Wong
*Assistant Examiner*—Minh D A
(74) *Attorney, Agent, or Firm*—Sughrue Mion, PLLC

(57) ABSTRACT

A display device in which a display panel is driven by converting a video signal of interlaced scanning inputted by field-to-field interpolation processing using fields of the same film frame into a video signal of line sequential scanning in the case that the video signal of the inputted video signal of interlaced scanning is a telecine-converted video signal by unit of field obtained by telecine-converting the film source of 24 frames per second, thinning out the video signal of line sequential scanning after the conversion, writing it in a memory by unit of field, repeatedly reading the video signal of line sequential scanning written into the memory by n times from the memory at a rate of n times as large as 24 Hz, and using the read video signal.

3 Claims, 14 Drawing Sheets

FIG. 14

SELECTIVE ERASING

| GRAY SCALE | Ds | HD 1 | 2 | 3 | 4 | 5 | 6 | 7 | 8 |
|---|---|---|---|---|---|---|---|---|---|
| 1 | 0000 | 1 | 0 | 0 | 0 | 0 | 0 | 0 | 0 |
| 2 | 0001 | 0 | 1 | 0 | 0 | 0 | 0 | 0 | 0 |
| 3 | 0010 | 0 | 0 | 1 | 0 | 0 | 0 | 0 | 0 |
| 4 | 0011 | 0 | 0 | 0 | 1 | 0 | 0 | 0 | 0 |
| 5 | 0100 | 0 | 0 | 0 | 0 | 1 | 0 | 0 | 0 |
| 6 | 0101 | 0 | 0 | 0 | 0 | 0 | 1 | 0 | 0 |
| 7 | 0110 | 0 | 0 | 0 | 0 | 0 | 0 | 1 | 0 |
| 8 | 0111 | 0 | 0 | 0 | 0 | 0 | 0 | 0 | 1 |
| 9 | 1000 | 0 | 0 | 0 | 0 | 0 | 0 | 0 | 0 |

LIGHT-EMISSION DRIVE PATTERN / LIGHT-EMISSION BRIGHTNESS

| SF1 | SF2 | SF3 | SF4 | SF5 | SF6 | SF7 | SF8 | $L_A$ | $L_B$ |
|---|---|---|---|---|---|---|---|---|---|
| ● | ○ | ○ | ○ | ○ | ○ | ○ | ○ | 0 | 0 |
|  | ● | ○ | ○ | ○ | ○ | ○ | ○ | 3 | 1 |
|  |  | ● | ○ | ○ | ○ | ○ | ○ | 14 | 7 |
|  |  |  | ● | ○ | ○ | ○ | ○ | 34 | 23 |
|  |  |  |  | ● | ○ | ○ | ○ | 64 | 47 |
|  |  |  |  |  | ● | ○ | ○ | 104 | 82 |
|  |  |  |  |  |  | ● | ○ | 155 | 128 |
|  |  |  |  |  |  |  | ● | 218 | 185 |
|  |  |  |  |  |  |  | ○ | 255 | 255 |

BLACK CIRCLES : SELECTIVE ERASE DISCHARGE STATE
WHITE CIRCLES : LIGHT-EMITTING STATE

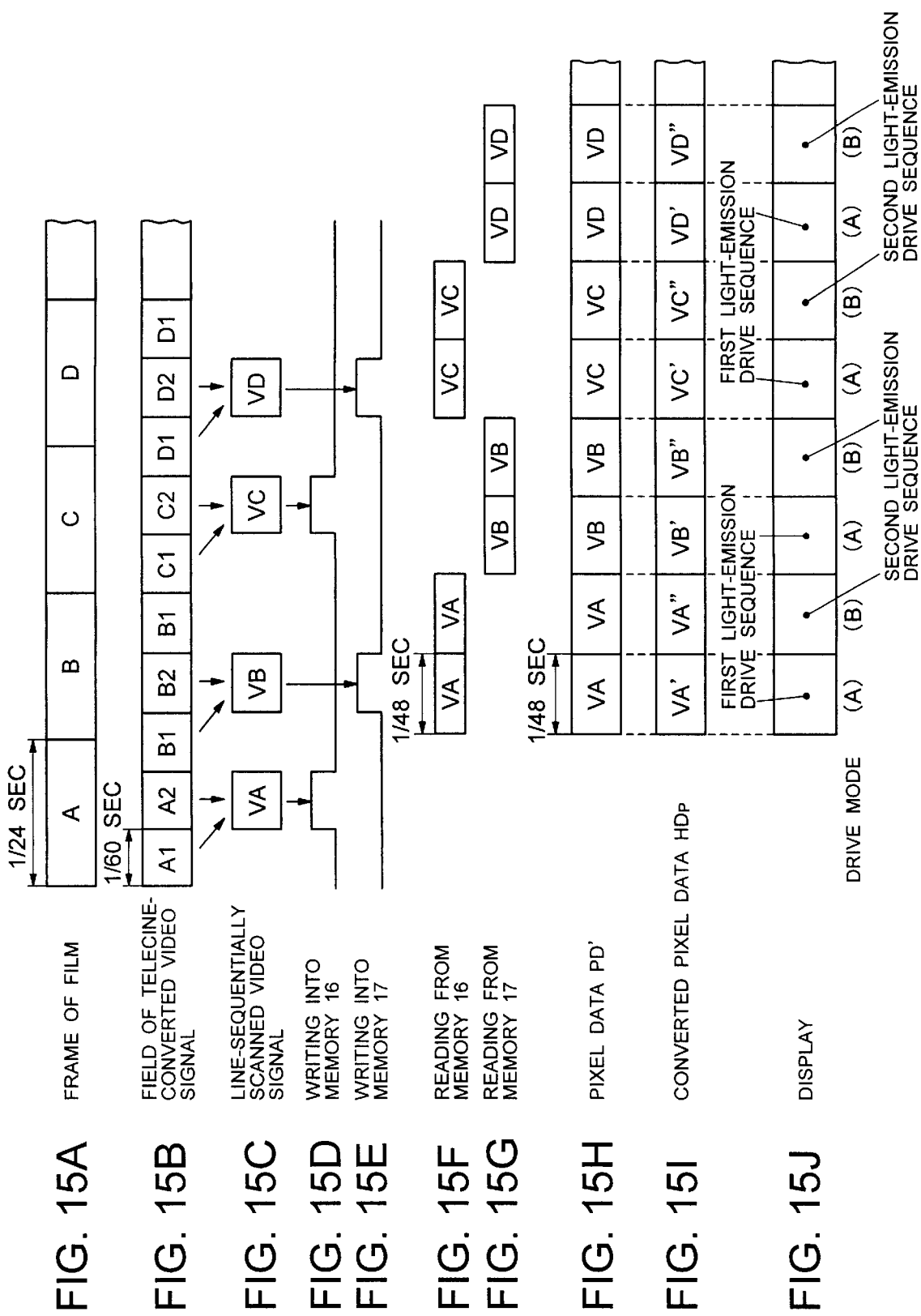

DISPLAY DEVICE

BACKGROUND OF THE INVENTION

1. Field of the Invention

The present invention relates to a matrix display device, such as a plasma display panel (PDP), an inorganic or organic electroluminescent (EL) panel, or a liquid crystal panel, capable of displaying an input video signal with high image quality, when the input video signal is a telecine-converted video signal which is converted from a picture like an movie film by means of a conversion system such as a 2–3 pulldown system.

2. Description of the Related Background Art video signals of a standard television system like the NTSC system often include a video signal based on a movie film. A movie film includes twenty-four frames per second. On the other hand, the video signal of the standard television system includes thirty frames per second and is a video signal using an interlaced scanning system, each of which consists of two fields. Since the numbers of frames per second are different from each other, a 2–3 pulldown system is generally used in order to obtain a video signal of the standard television system from a movie film. In the 2–3 pulldown system, the video signal is generated by telecine-converting respective frames of a movie film.

In the telecine-conversion of the 2–3 pulldown system, a first field and a second field for the first frame of the video signal are formed from a first frame of the movie film, a first field and a second field for a second frame and the first field for a third frame of the video signal are formed from the second frame of the movie film, and a second field for the third frame and a first field for a fourth frame of the video signal are formed from a third frame of the movie film. Likewise, for subsequent frames of the movie film, two fields, three fields, two fields, three fields, . . . of the video signal are formed from the respective frames of the movie film by means of the same conversion scheme.

For every two continuos frames of the movie film, five fields of the video signal of the standard television system are converted. The first frame of the two continuos frames correspond to the beginning two fields of the five fields and the second frame of the two continues frames correspond to the remaining three fields of the five fields.

In displaying the telecine-converted pictures of the video signal of interlaced scanning on a display device like a PDP, the above third frame, for example, of continuous frames of the video signal is formed by combining the pictures of the second and third frames of the movie film. Therefore, there is a problem that each picture displayed in accordance with the video signal is inferior to that of an original movie film in picture quality.

SUMMARY OF THE INVENTION

An object of the present invention, therefore, is to provide a display device which is capable of obtaining high display quality for telecine-converted pictures.

A display device according to the present invention comprises a detector for detecting whether or not an input video signal of interlaced scanning is a telecine-converted video signal by unit of field obtained by telecine-converting a film source which has 24 frames per second; a line sequential scan convertor for converting the inputted video signal of interlaced scanning into a video signal of line sequential scanning by field-to-field interpolation processing using fields of the same film frame if the detector determines that the input video signal of interlaced scanning is a telecine-converted video signal; a memory; a memory controller of thinning out the video signal of line sequential scanning converted by the line sequential scan convertor to write it into the memory by unit of field, and repeatedly reading the video signal of line sequential scanning written into the memory by n times from the memory at a rate of n times (n: an integer of 2 or more) as large as 24 Hz; and a driving device for driving a display panel with the video signal of line sequential scanning read from the memory.

BRIEF DESCRIPTION OF THE DRAWINGS

FIG. 14 is a view showing all patterns of light-emission drive performed in accordance with the light-emission drive formats of FIG. 5 and an example of a conversion table used for a second data converter 34 in performing the light-emission drive; and FIGS. 15A to 15J are views showing the operations of respective components of the display device of FIG. 3.

DETAILED DESCRIPTION OF THE PREFERRED EMBODIMENTS

Embodiments of the present invention will be described below with reference to the drawings.

Figure 1:
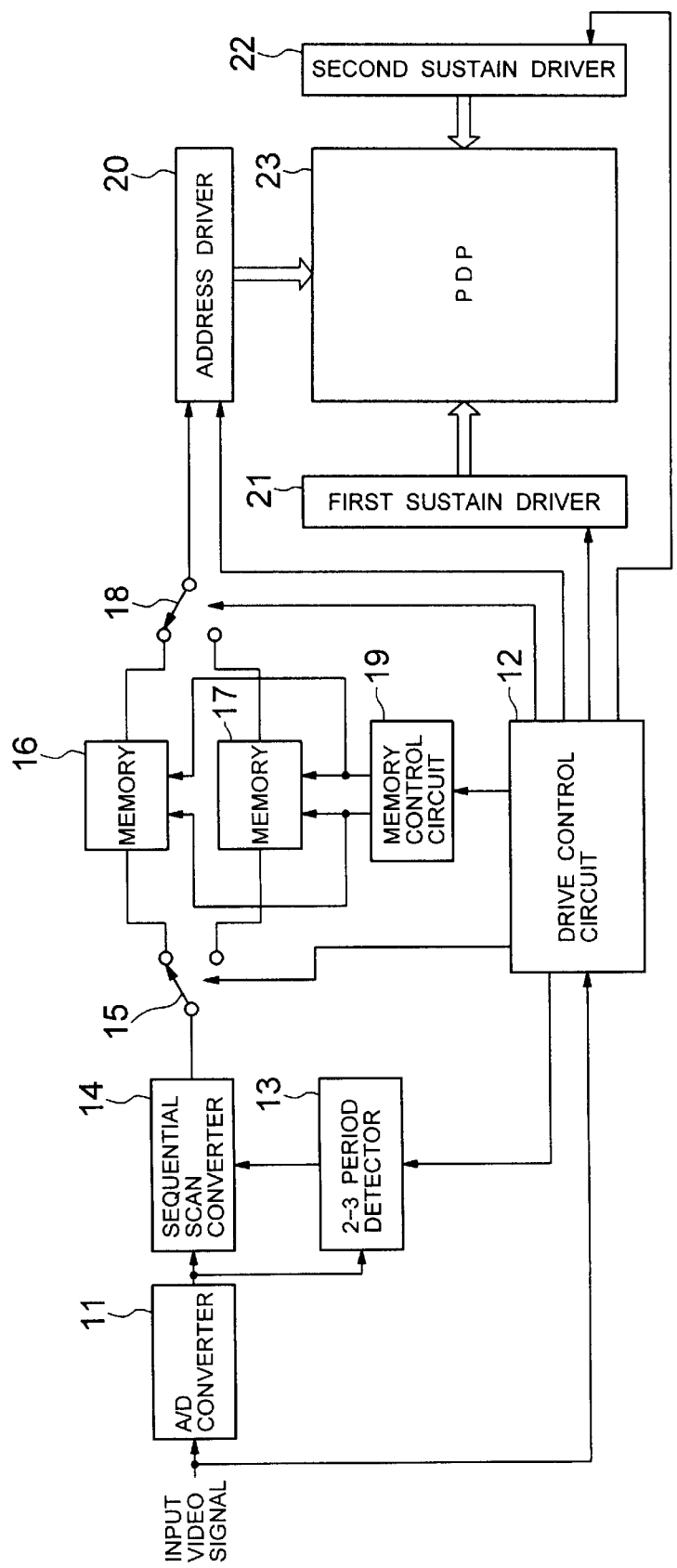
FIG. 1 is a block diagram showing the general configuration of a display device according to the present invention.

FIG. 1 shows a display device according to the present invention. In the display device, an input video signal in the NTSC system is supplied to an A/D converter 11 and a drive control circuit 12. The A/D converter 11 samples an analog input video signal in response to a clock signal supplied from the drive control circuit 12 to convert the video signal into, for example, 8-bit pixel data (input pixel data) for each pixel. The output of the A/D converter 11 is connected to a 2–3 period detector 13 and a sequential scan converter 14.

The 2–3 period detector 13 determines which of a two-field signal component or three-field signal component per frame is included in a video signal supplied from the A/D converter 11. For example, the 2–3 period detector 13 accumulates the absolute value of a difference per pixel in the video signals between continuous frames for one field period and compares the accumulated value with a predetermined threshold value. If the accumulated value is higher than the predetermined threshold value, it determines as a moving picture field. If it is smaller, it determines as a still picture field. The moving picture field is determined when each of the continuous frames has a different picture field, while the still picture field is determined when each of the continuous frames has the same picture field. In the case of the video signal telecine-converted by using the 2–3 pulldown system, the still picture field is generated per five fields. Therefore, when the still picture field is detected, the field is the last one in a signal component for three fields. The signal detected by the 2–3 period detector 13 is supplied to the sequential scan converter 14.

The sequential scan converter 14 converts the video signal into a video signal of line sequential scanning in response to the signal detected by the 2–3 period detector 13. In the signal component for two fields, the two fields are hold once respectively and outputted in turn. In the signal component for three fields, the first two fields are hold once respectively and outputted in turn. That is, when the 2–3 period detector 13 detects a static picture field, the static picture field is ignored.

The output of the sequential scan converter 14 is connected to a changeover switch 15. The changeover switch 15 is used for supplying the output signal of the sequential scan converter 14 to either of memories 16 and 17. The changeover switch 15 is connected to the write input of the memories 16 and 17 and a changeover switch 18 is connected to the read output of the memories 16 and 17, respectively. The changeover switch 18 is used for switching and outputting a video signal read out from either of the memories 16 and 17. Each of the memories 16 and 17 has a predetermined capacity, and its write/read operation is controlled by a memory control circuit 19.

An address driver 20 generates, in response to a timing signal supplied by the drive control circuit 12, m pulses of pixel data having voltages corresponding to respective logic levels of the converted pixel data bits for a line of video signal which are read from the memories 16 and 17, and applies these pulses to column electrodes $D_1$ to $D_m$ of a PDP 23, respectively.

The PDP 23 includes the column electrodes $D_1$ to $D_m$ as address electrodes, and row electrodes $X_1$ to $X_n$ and row electrodes $Y_1$ to $Y_n$, which are disposed orthogonal to the column electrodes. The PDP 23 allows a pair of a row electrode X and a row electrode Y to form a row electrode corresponding to one line. That is, in the PDP 23, the row electrode pair of the first line consists of row electrodes $X_1$ and $Y_1$, and the row electrode pair of the n-th line consists of row electrodes $X_n$ and $Y_n$. The aforementioned pairs of row electrodes and column electrodes are coated with a dielectric layer exposed to a discharge space, and each row electrode pair and column electrode are configured so as to form a discharge cell corresponding to one pixel at their intersection.

A first sustain driver 21 and a second sustain driver 22 each generates drive pulses in accordance with the timing signal supplied by the drive control circuit 12 and applies them to the row electrodes $X_1$ to $X_n$ and $Y_1$ to $Y_n$ of the PDP 23.

The drive control circuit 12 generates clock signals for the A/D converter 11, switching signals for the respective switches 15, 18, and write/read timing signals for the memories 16, 17 by the memory control circuit 19 in synchronization with the horizontal and vertical synchronizing signals included in the aforementioned input video signal. Furthermore, the drive control circuit 12 generates various timing signals for controllably driving of an address driver 20, a first sustain driver 21, and a second sustain driver 22 in synchronization with the horizontal and vertical synchronizing signals.

Figure 2:
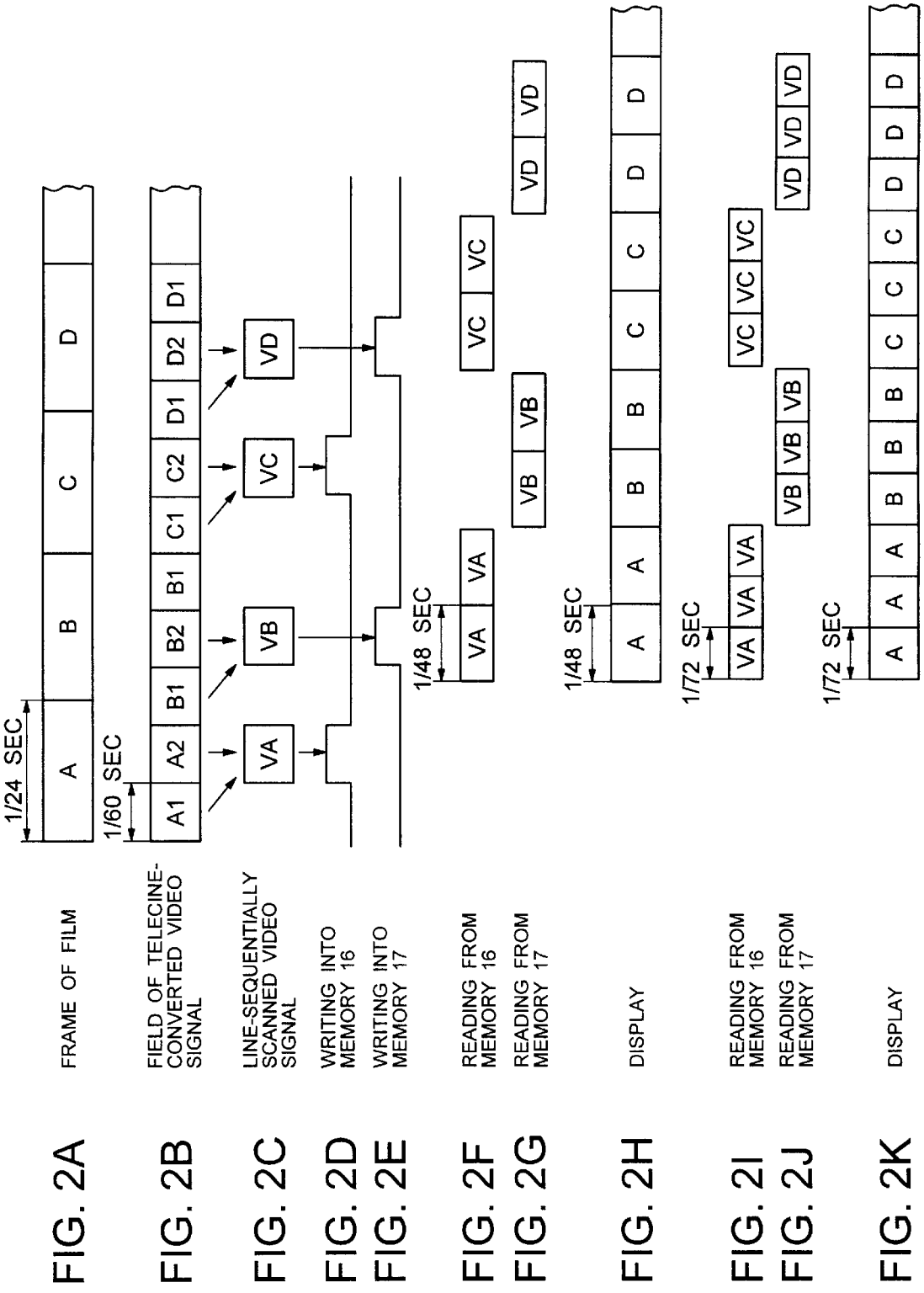
FIGS. 2A to 2K are views showing the operations of respective components of the display device of FIG. 1.

In the display device having the aforementioned constitution, if the input video signal is a video signal telecine-converted by the 2–3 pulldown system, the video signal has a field column as shown in FIG. 2B for the frames A, B, C, D, ... of a film shown in FIG. 2A. That is, the video signal has the first field A1 and the second field A2 of a first frame for the frame A, and the first field B1 and the second field B2 of a second frame and the first field B1 of a third frame for the frame B, respectively. For the frame C, it has the second field C1 of the third frame and the first field C2 of a fourth frame, and for the frame D, the second field D1 of the fourth frame and the first field D2 and the second field D1 of a fifth frame, respectively. The length of each field is $\frac{1}{60}$ seconds relative to the length of each frame of $\frac{1}{24}$ seconds.

The sequential scan converter 14 converts the telecine-converted video signal into the video signal of line sequential scanning, and obtains the signals alternately by the line from the first field A1 and the second field A2 of the first frame shown in FIG. 2B and generates a video signal VA for one screen as shown in FIG. 2C. Similarly, the converter 14 obtains the signals alternately by the line from the first field B1 and the second field B2 of the second frame and generates a video signal VB for one screen. The converter 14 also obtains the signals alternately by the line from the second field C1 of the third frame and the first field C2 of the fourth frame and generates a video signal VC for one screen. Moreover, the converter 14 obtains the signals alternately by the line from the second field D1 of the fourth frame and the first field D2 of the fifth frame and generates a video signal VD for one screen. The length of each of the video signals VA, VB, VC, VD is $\frac{1}{30}$ sec.

The memory control circuit 19 writes the output video signal of the sequential scan converter 14 into the memories 16, 17alternately through the changeover switch 15. The video signals are thinned out and written at 24 Hz. When the video signal VA is thinned out and written into the memory 16 as shown in FIG. 2D, the video signal VB is thinned out and written into the memory 17 as shown in FIG. 2E. The video signal VC is thinned out and written into the memory 16, and the video signal VD is thinned out and written into the memory 17.

The video signals VA, VB, VC, VD thinned out and written in the memories 16, 17 are read by means of the control of the memory controller 19. The reading is repeated twice at 48 Hz in the memories 16, 17, respectively. That is, the video signal VA is read twice from the memory 16 as shown in FIG. 2F, and as shown in FIG. 2G, the video signal VB is read twice from the memory 17. Similarly, the video signal VC is read twice from the memory 16, and the video signal VD is read twice from the memory 17.

The video signal (pixel data) read from the memories 16, 17 respectively is supplied to the address driver 20 sequentially through the changeover switch 18. The address driver 20 generates sequentially m pulses of pixel data having voltages corresponding to respective logic levels of the pixel data bits for a line of the video signal, and applies these pulses to the column electrodes $D_1$ to $D_m$ of PDP 23, respectively. The first and second sustain drivers 21 and 12 generate the drive pulses and applies them to the row electrodes $X_1$ to $X_n$ and $Y_1$ to $Y_n$ of PDP 23. As a result, the pictures corresponding to the video signals read from the memories 16, 17 respectively are displayed on PDP 23.

As described above, for the video signal VA read from the memory 16, the picture by the video signal VA is displayed twice consecutively by ⅟48 sec. each, as shown in FIG. 2H. The pictures by respective video signals are displayed twice consecutively by ⅟48 sec. each, for the video signals VB, VC, VD as well from the memory 16 or 17. That is, one screen display is made in ⅟24 sec. like the frame of the movie film shown in FIG. 2A.

Reading the respective video signals VA, VB, VC, VD thinned out and written in the memories 16, 17 may be repeated by n times at n×24 Hz, where n is an integer of 2 or more. In the case that reading is repeated three times at 72 Hz, for example, the video signal VA is read by three times from the memory 16 as shown in FIG. 2I, and the video signal VB is read by three times from the memory 17 as shown in FIG. 2J. Similarly, the video signal VC is read by three times from the memory 16, and the video signal VD is read by three times from the memory 17. For the video signal VA read from the memory 16, the picture by the video signal VA is displayed by three times consecutively by ⅟72 sec. as shown in FIG. 2K. For the video signals VB, VC, VD from the memory 16 or 17 as well, the picture by each video signal is displayed by three times consecutively by ⅟72 sec. each. That is, one screen display is made in ⅟24 sec. like the frame of the movie film shown in FIG. 2A.

Figure 3:
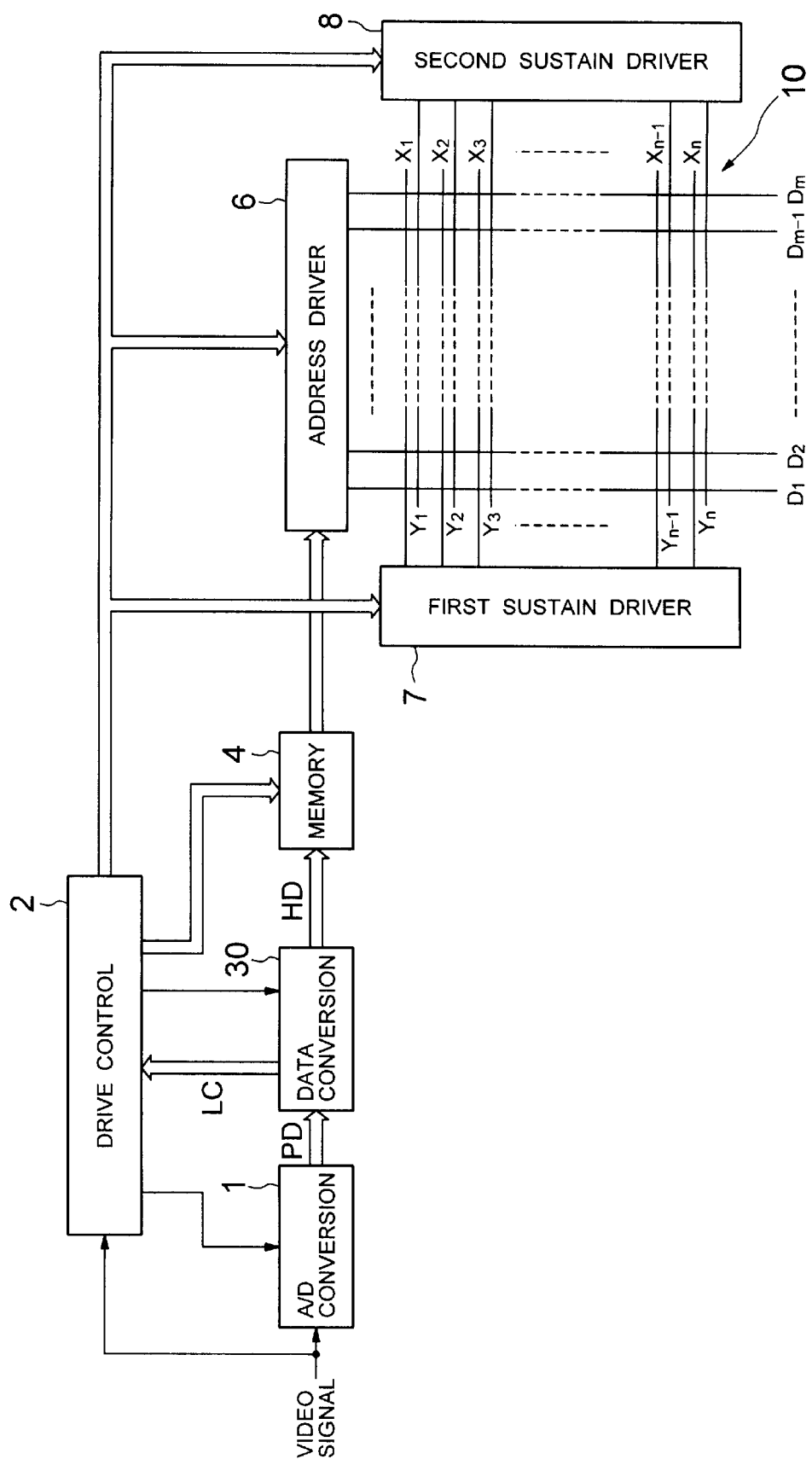
FIG. 3 is a block diagram showing the general configuration of a display device as another embodiment of the present invention.

FIG. 3 is a view showing the general configuration of a plasma display device for driving a plasma display panel (hereinafter designated "PDP") as another embodiment of the present invention.

Referring to FIG. 3, an A/D converter 1 samples an analog input video signal in response to a clock signal supplied by the drive control circuit 2 to convert the video signal into, for example, 8-bit pixel data (input pixel data) PD for each pixel. Then the data is supplied to the data converter 30.

The drive control circuit 2 generates clock signals for the aforementioned A/D converter 1 and write/read signals for the memory 4 in synchronization with the horizontal and vertical synchronizing signals included in the aforementioned input video signal. Furthermore, the drive control circuit 2 generates various timing signals for controllably driving each of an address driver 6, a first sustain driver 7, and a second sustain driver 8 in synchronization with the horizontal and vertical synchronizing signals.

The data converter 30 converts the 8-bit pixel data PD into 8-bit converted pixel data (display pixel data) HD which is in turn supplied to the memory 4. Incidentally, the conversion operation of the data converter 30 is to be described later.

The memory 4 performs writing sequentially the converted pixel data HD mentioned above in accordance with write signals supplied by the drive control circuit 2. After data for one screen (n rows and m columns) has been written through the write operation, the memory 4 divides the converted pixel data $HD_{11\text{-}nm}$ for one screen into each bit digit for reading, which is in turn supplied sequentially to the addressing driver 6 for each one line.

The addressing driver 6 generates, in accordance with a timing signal supplied by the drive control circuit 2, m pulses of pixel data having voltages corresponding to respective logic levels of the converted pixel data bits for a line which are read from the memory 4. These pulses are applied to column electrodes $D_1$ to $D_m$ of PDP 10, respectively.

The PDP 10 comprises the aforementioned column electrodes $D_1$ to $D_m$ as address electrodes, and row electrodes $X_1$ to $X_n$ and row electrodes $Y_1$ to $Y_n$ which are disposed orthogonal to the column electrodes. The PDP 10 allows a pair of a row electrode X and a row electrode Y to form a row electrode corresponding to one line. That is, in the PDP 10, the row electrode pair of the first line consists of row electrodes $X_1$ and $Y_1$ and the row electrode pair of the nth line consists of row electrodes $X_n$ and $Y_n$. The aforementioned pairs of row electrodes and column electrodes are coated with a dielectric layer exposed to a discharge space, and each row electrode pair and column electrode are configured so as to form a discharge cell corresponding to one pixel at their intersection.

In accordance with a timing signal supplied by the drive control circuit 2, the first and second sustain drivers 7 and 8 generate the various drive pulses, respectively, which are to be explained below. These pulses are in turn applied to the row electrodes $X_1$ to $X_n$ and $Y_1$ to $Y_n$ of the PDP 10.

Figure 4:
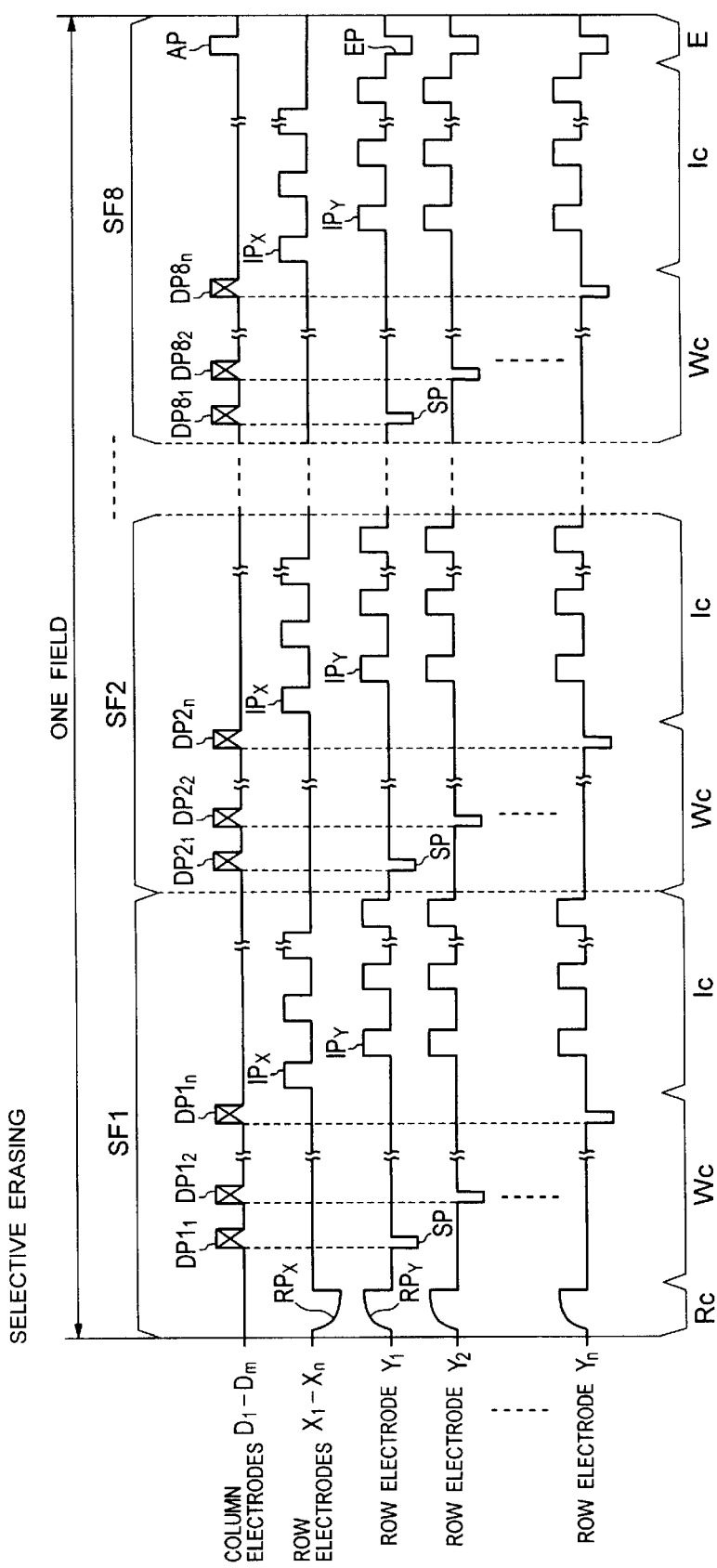
FIG. 4 is a view showing the application timing of various drive pulses which are applied to a plasma display panel (PDP) 10.

FIG. 4 is a view showing the application timing of various drive pulses which are applied to the column electrodes $D_1$ to $D_m$, and the row electrodes $X_1$ to $X_n$ and $Y_1$ to $Y_n$ by the aforementioned address driver 6, and the first and second sustain drivers 7 and 8, respectively.

In the example shown in FIG. 4, a display period of one field is divided into 8 sub-fields SF1 to SF8 to drive the PDP 10. In each of the sub-fields, the pixel data writing step Wc is performed to write pixel data to each discharge cell of the PDP 10 for setting light-emitting and non-light-emitting cells. The light-emission sustaining step Ic is also performed in each of the sub-fields to sustain light-emission of only light-emitting cells mentioned above for a period (the number of times) corresponding to the weight assigned to each sub-field. Additionally, only in the head sub-field SF1, the simultaneous reset process Rc for initializing all discharge cells of the PDP 10 is performed and the erase process E is executed only in the last sub-field SF8.

First, in the aforementioned simultaneous reset process Rc, the first and second sustain drivers 7 and 8 apply simultaneously the reset pulses RPX and RPY shown in FIG. 4 to the row electrodes $X_1$ to $X_n$ and $Y_1$ to $Y_n$ of the PDP 10, respectively. The application of these reset pulses $RP_X$ and $RP_Y$ will cause all discharge cells of the PDP 10 to be reset and discharge, forming a predetermined uniform wall charge in each of the discharge cells. This will set all discharge cells of the PDP 10 to the aforementioned light-emitting cells.

Next, in each pixel data writing step Wc of FIG. 4, the address driver 6 applies sequentially pixel data pulse groups $DP1_{1\text{-}n}$, $DP2_{1\text{-}n}$, $DP3_{1\text{-}n}$, ..., $DP8_{1\text{-}n}$ for respective lines to the column electrodes $D_1$ to $D_m$ as shown in FIG. 4. That is, in the sub-field SF1, the address driver 6 applies sequentially a pixel data pulse group $DP1_{1\text{-}n}$ to the column electrodes $D_1$ to $D_n$ for each one of the lines to the column electrodes $D_1$ to $D_m$ as shown in FIG. 4. The pixel data pulse group $DP1_{1\text{-}n}$ corresponds to each of the first to the nth line and is generated in accordance with the first bit of each of the aforementioned converted pixel data $HD_{11\text{-}nm}$. Moreover, in the sub-field SF2, the address driver 6 applies sequentially a pixel data pulse group $DP2_{1\text{-}n}$ to the column electrodes $D_1$ to $D_m$ for each one of the lines to the column electrodes $D_1$ to $D_m$ as shown in FIG. 4, the pixel data pulse group $DP2_{1-n}$ being generated in accordance with the second bit of each of the aforementioned converted pixel data $HD_{11-nm}$. At this time, the address driver 6 generates high-tension pixel data pulses to apply them to the column electrodes D only when the bit logic of the converted pixel data is, for example, a logic level of "1". The second sustain driver 8 generates the scan pulses SP shown in FIG. 4 to apply them in sequence to the row electrodes $Y_1$ to $Y_n$ at the same time as the application timing of each of the pixel data pulse groups. At this time, discharge (selective erase discharge) is caused only at the discharge cells located at the intersections of the "lines" to which the scan pulse SP is applied and the "columns" to which a high-tension pixel data pulse is applied. The wall charges remaining within the discharge cells are selectively erased. The selective erasing discharge causes the discharge cells that have been initialized into the light-emitting status at the aforementioned simultaneous reset process Rc to change to the non-light-emitting state. Incidentally, no discharge is generated in the discharge cells that are formed in the "columns" to which the aforementioned high-tension pixel data pulse has not been applied but to the state of being initialized at the aforementioned simultaneous reset process Rc, that is, the light-emitting state is sustained.

That is, the pixel data writing step Wc is performed so that the light-emitting cells where the light-emitting state is sustained at the light-emitting sustain process to be described later and the non-light-emitting cells where an off state remains are set alternatively in accordance with pixel data. That is, pixel data is written to each of the discharge cells.

In each light-emission sustaining step Ic shown in FIG. 3, the first and second sustain drivers 7 and 8 apply the sustain pulses $IP_X$ and $IP_Y$ to the row electrodes $X_1$ to $X_n$ and $Y_1$ to $Y_n$ as shown in FIG. 4. At this time, the discharge cells where wall charges remain by the aforementioned pixel data writing step Wc, that is, the light-emitting cells repeat discharge and light-emission to sustain their light-emitting state over the period of application of the sustain pulses $IP_X$ and $IP_Y$ thereto. The light-emission sustaining period (the number of times) is set corresponding to the weight assigned to each sub-field.

Figure 5:
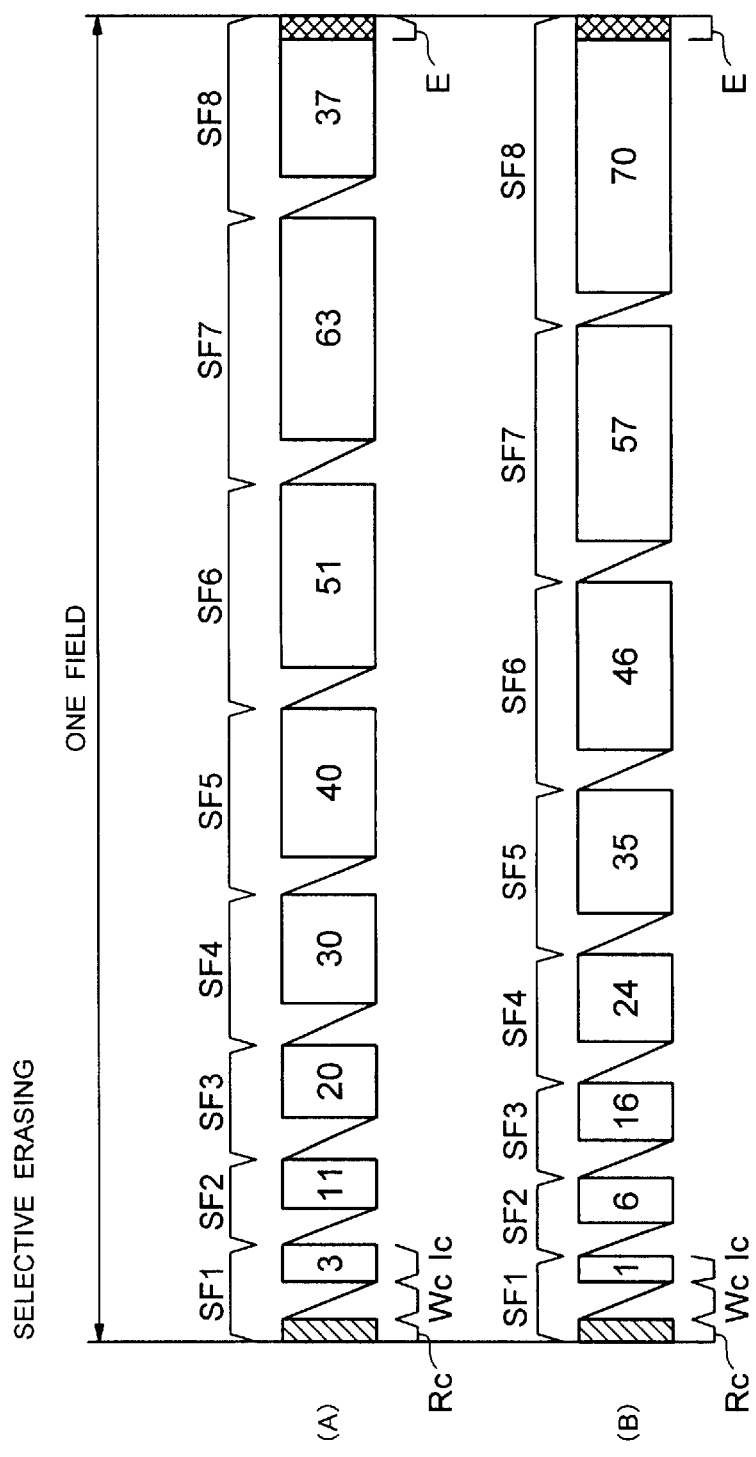
FIGS. 5A and 5B are views showing light-emission drive formats in accordance with the driving method of the present invention.

FIGS. 5A and 5B are views showing light-emission drive formats in which a light-emission sustaining period (the number of times) for each of the sub-fields is described.

Incidentally, the drive mode (A) of FIG. 5A is employed, for example, in light-emission drive of even fields (or even frames), while the drive mode (B) of FIG. 5B is employed in light-emission drive of odd fields (or odd frames).

That is, in the display period of an even field, the light-emission period in the light-emission sustaining step Ic of each of the sub-fields SF1 to SF8 is set as follows as shown in the drive mode (A):

| | |
|---|---|
| SF1: | 3 |
| SF2: | 11 |
| SF3: | 20 |
| SF4: | 30 |
| SF5: | 40 |
| SF6: | 51 |
| SF7: | 63 |
| SF8: | 37 |

In the display period of an odd field, the light-emitting period in the light-emission sustaining step Ic of each of the sub-fields SF1 to SF8 is set as follows as shown in the drive mode (B):

| | |
|---|---|
| SF1: | 1 |
| SF2: | 6 |
| SF3: | 16 |
| SF4: | 24 |
| SF5: | 35 |
| SF6: | 46 |
| SF7: | 57 |
| SF8: | 70 |

In the foregoing, the ratio of the light-emission period in each of the sub-fields SF1 to SF8 is non-linear (i.e., inverse Gamma ratio, $Y=X^{2.2}$), thereby compensating for the non-linear characteristics (Gamma characteristics) of input pixel data D.

That is, in each light-emission sustaining step Ic, only those discharge cells that have been set to light-emitting cells in the pixel data writing step Wc performed immediately before the process Ic emit light over the light-emitting period shown in the drive mode (A) during the display period of an even field and in the drive mode (B) during the display period of an odd field.

Additionally, in the erase process E shown in FIG. 4, the address driver 6 generates an erase pulse AP to apply it to respective column electrodes $D_{1-m}$. Furthermore, the second sustain driver 8 generates the erase pulse EP simultaneously at the application timing of the erase pulse AP to apply it to respective row electrodes $Y_1$ to $Y_n$. This simultaneous application of the erase pulses AP and EP causes erase discharge to be generated in all discharge cells of the PDP 10, allowing wall charges remaining within all discharge cells to disappear.

That is, executing the erase process E causes all discharge cells of the PDP 10 to be turned to non-light-emitting cells.

Figure 6:
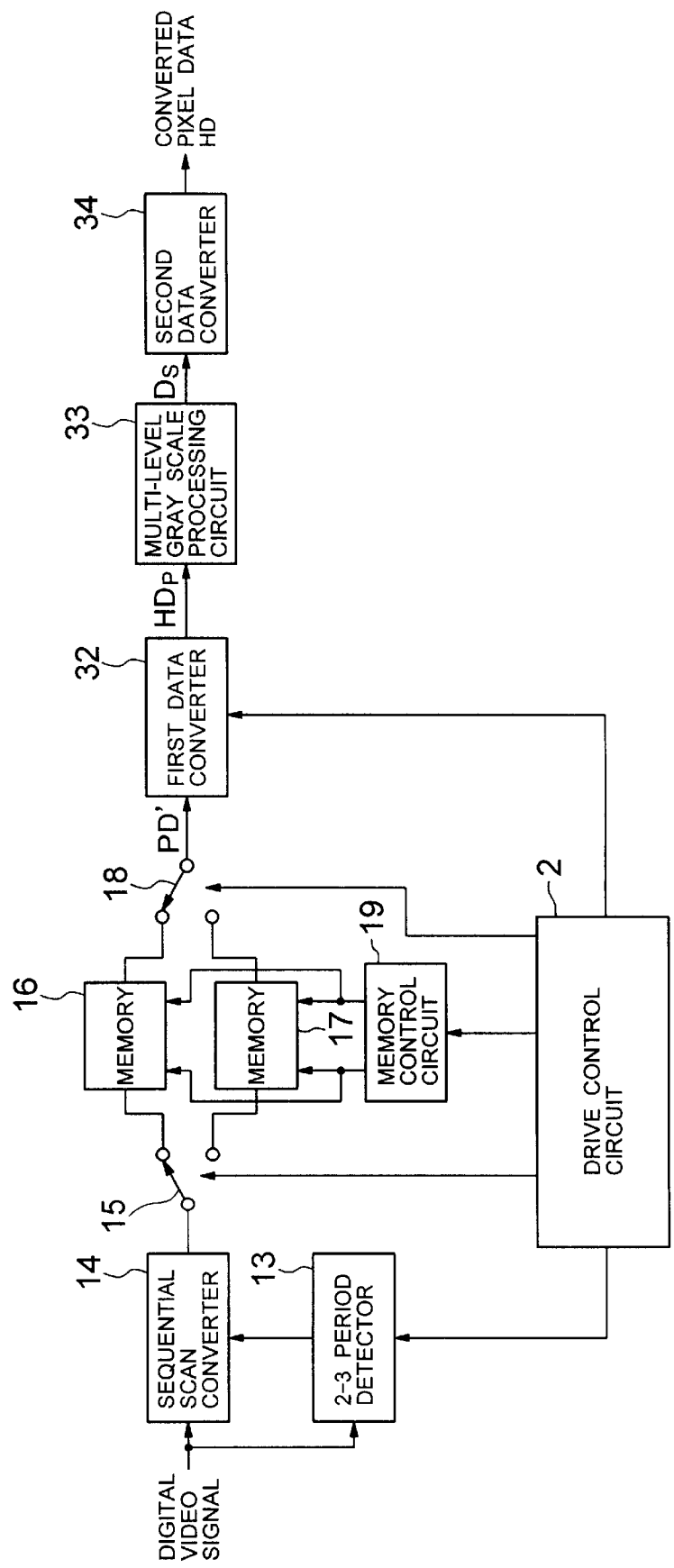
FIG. 6 is a view showing the internal configuration of a data converter 30.

FIG. 6 is a view showing the internal configuration of the data converter 30 shown in FIG. 3.

As shown in FIG. 6, the data converter 30 comprises a 2–3 period detector 13, a sequential scan converter 14, change-over switches 15 and 18, memories 16 and 17, memory controller 19, a first data converter 32, a multi-level gray scale processing circuit 33, and a second data converter 34. The 2–3 period detector 13, sequential scan converter 14, change-over switches 15 and 18, memories 16 and 17, memory controller 19 are the same as those shown in FIG. 1.

The first data converter 32 of FIG. 6 converts the pixel data PD' of a 256-level gray scale and 8 bits, which is an image signal supplied by the change-over switch 18, into the converted pixel data $HD_P$ of 8 bits (0 to 128). Then, the data converted pixel data $HD_P$ is supplied to the multi-level gray scale processing circuit 33.

Figure 7:
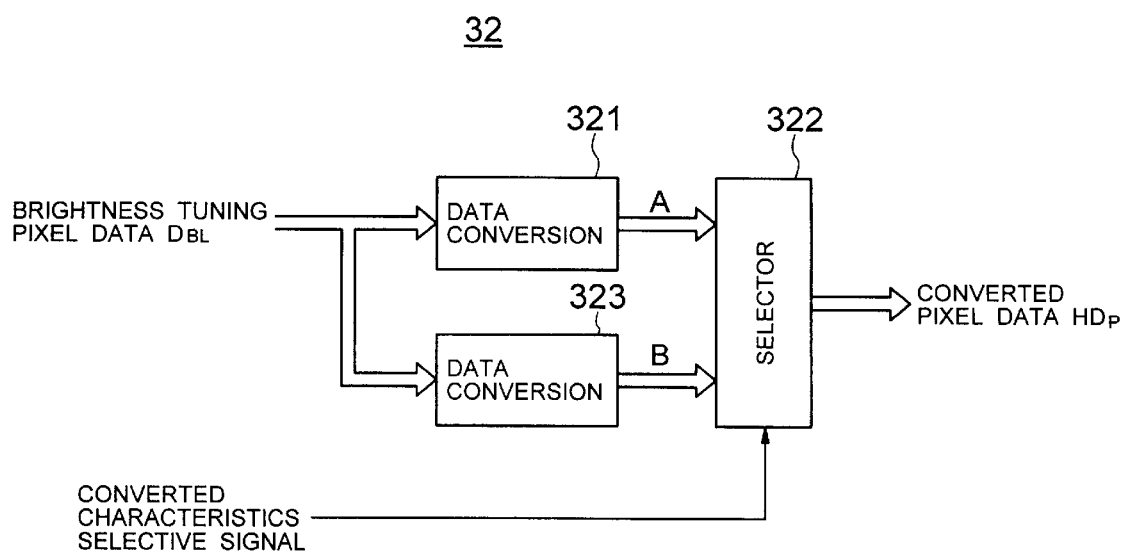
FIG. 7 is a view showing the internal configuration of a first data converter 32.

FIG. 7 is a view showing the internal configuration of the first data converter 32.

Figure 8:
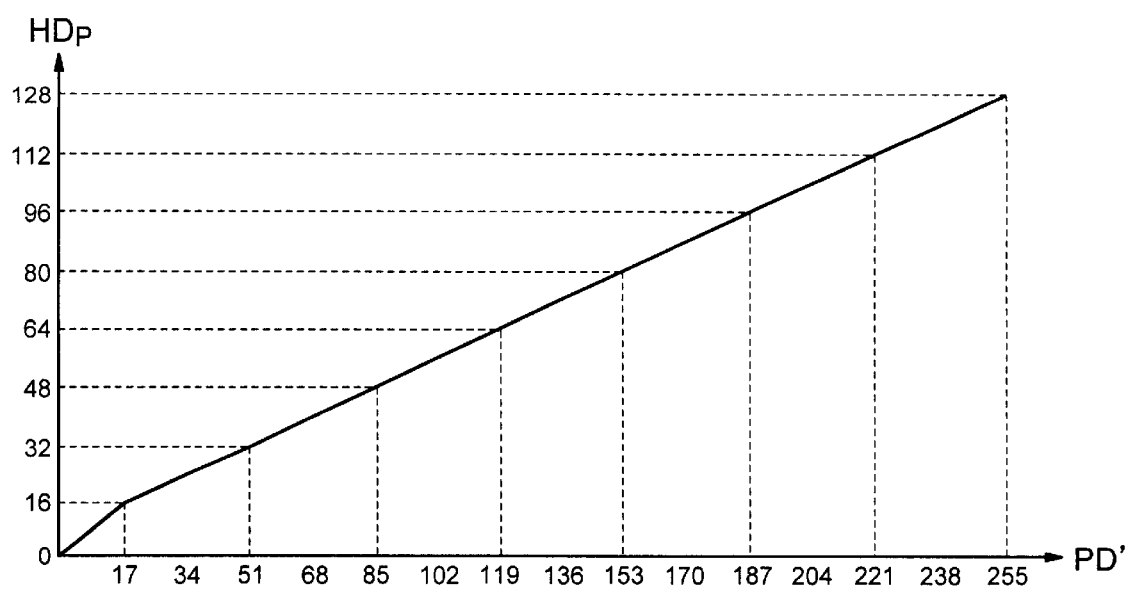
FIG. 8 is a view showing the first conversion characteristics in a first data converter 32.
Figure 9:
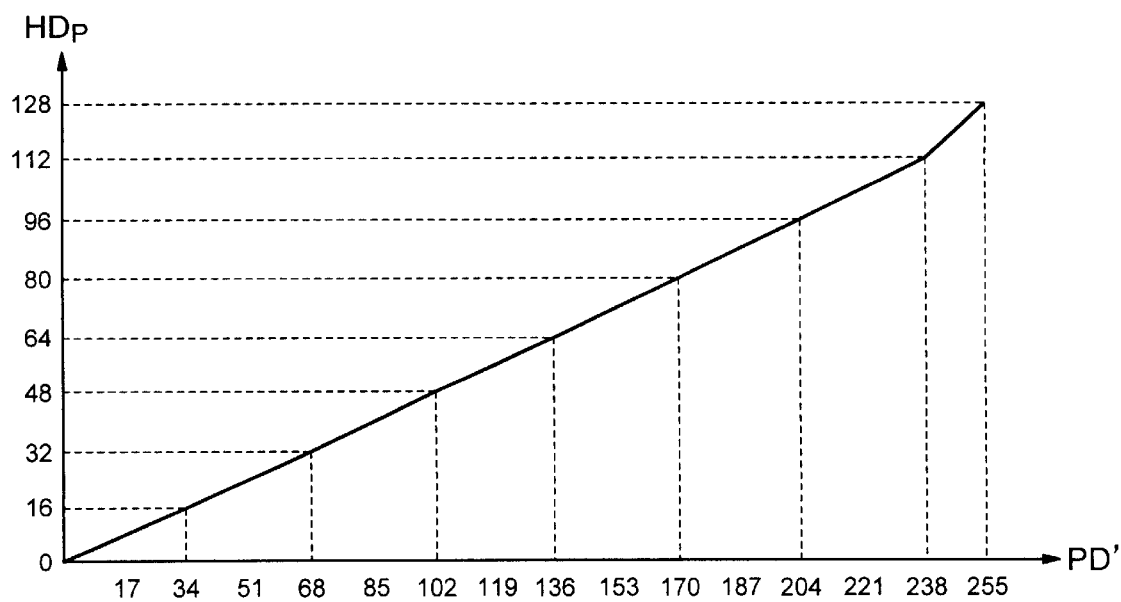
FIG. 9 is a view showing the second conversion characteristics in the first data converter 32.

In FIG. 7, a data converter 321 converts the aforementioned pixel data PD' into the converted pixel data A of 8 bits (0 to 128), in accordance with the conversion characteristics shown in FIG. 8, which is in turn supplied to a selector 322. A data converter 323 converts the aforementioned pixel data PD' into the converted pixel data B of 8 bits (0 to 128), in accordance with the conversion characteristics shown in FIG. 9, which is in turn supplied to the selector 322. The selector 322 alternatively selects one of the converted pixel data A and B which corresponds to the logic level of a conversion characteristics selective signal and outputs one of the converted pixel data A or B as the converted pixel data HDp. The conversion characteristics selective signal is a signal that is supplied by the drive control circuit 2 shown in FIG. 3 and shifts, in response to the vertical synchronization timing of the input pixel data D, from logic level "1" to "0" or "0" to "1". In the foregoing, the conversion characteristics of FIG. 8 are paired with the drive mode (B) of FIG. 5B and the conversion characteristics of FIG. 9 are paired with the drive mode (A) of FIG. 5A. That is, the selector 322 selects the converted pixel data B in a field (an even field) in which the drive mode (A) of FIG. 5A is set. On the other hand, the converted pixel data A is selected in a field (an odd field) to which the drive mode (B) of FIG. 5B is set. Then, the data A and B is outputted as converted pixel data $HD_P$. Incidentally, the aforementioned conversion characteristics are set in accordance with the number of bits of input pixel data, the number of compressed bits resulting from multi-level gray scale processing, and the number of gray scale levels for display. As such, the first data converter 32 is provided at the front stage of the multi-level gray-scale processing circuit 33 to be described later. This allows for performing conversion into the number of gray-scale levels for display and the number of compressed bits resulting from multi-level gray scale processing. This allows the pixel data PD' to be divided at a bit boundary into an upper bit group (corresponding to multi-level gray scale pixel data) and a lower bit group (data to be discarded, error data). In accordance with this signal, the multi-level gray scale processing is to be performed. This allows for preventing the occurrence of flat portions, caused by the occurrence of brightness saturation resulting from the multi-level gray scale processing and the absence of display levels of gray scale at a bit boundary, in the display characteristics (that is, the occurrence of disorder in gray scale levels).

The configuration shown in FIG. 7 allows the first data converter 32 to switch the conversion characteristics (FIG. 8 and FIG. 9) of the brightness-tuning pixel data $D_{BL}$ of 8 bits (0 to 255) supplied by the aforementioned ABL circuit 31 at each one field (frame). At the same time, the first data converter 32 converts the pixel data PD' into the converted pixel data $HD_P$ of 8 bits (0 to 128) which is in turn supplied to the multi-level gray-scale processing circuit 33.

Figure 10:
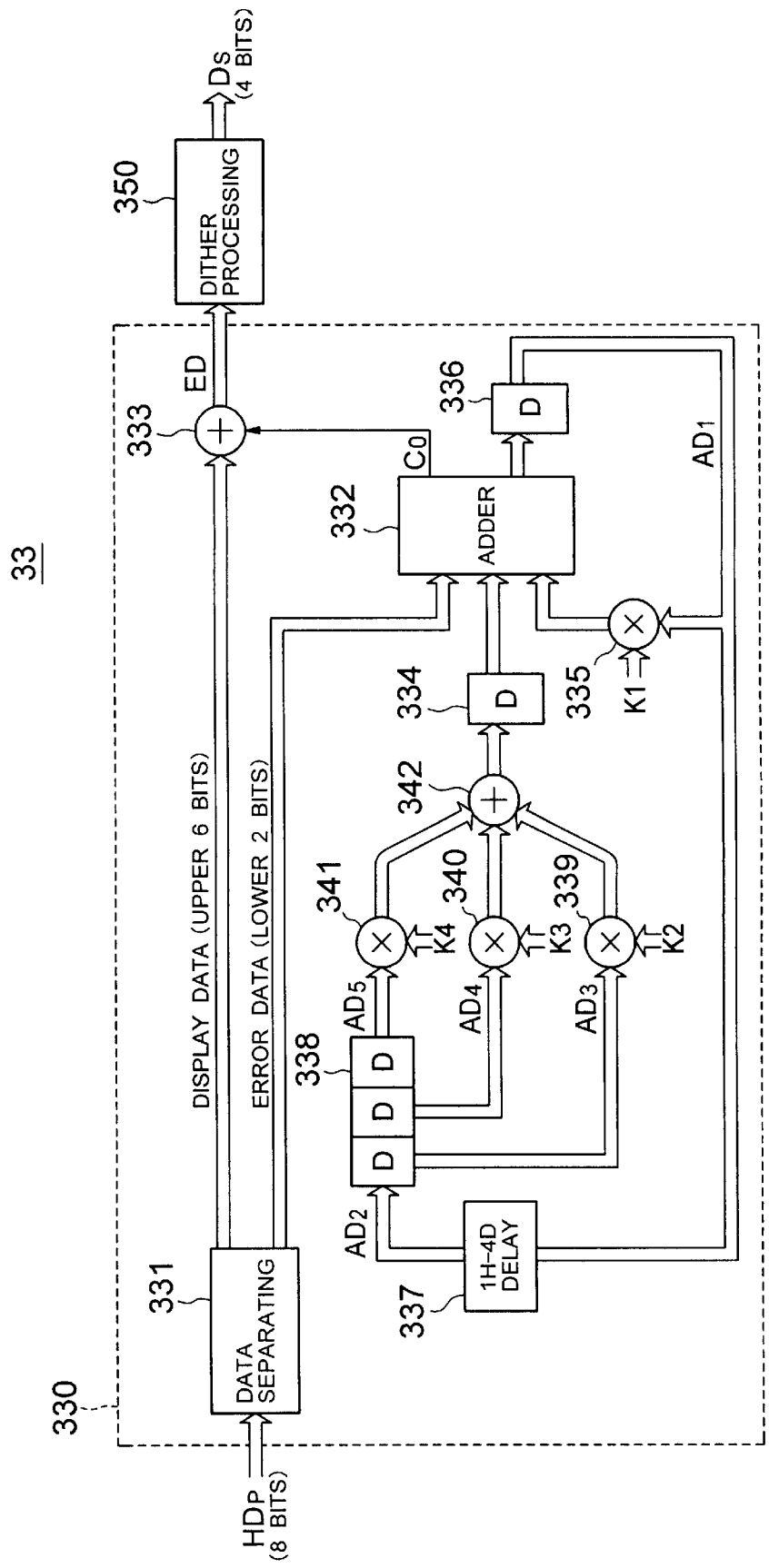
FIG. 10 is a view showing the internal configuration of a multi-level gray scale processing circuit 33.

FIG. 10 is a view showing the internal configuration of the multi-level gray scale processing circuit 33.

As shown in FIG. 10, the multi-level gray scale processing circuit 33 comprises an error diffusion processing circuit 330 and dither processing circuit 350.

First, the data separation circuit 331 of the error diffusion processing circuit 330 separates the lower 2 bits of the 8-bit converted pixel data $HD_P$ supplied by the aforementioned first data converter 32 into error data and the upper 6 bits into display data.

The adder 332 supplies, to the delay circuit 336, an additional value obtained by adding the lower 2 bits as error data of the converted pixel data $HD_P$, the delay output from the delay circuit 334, and a multiplication output of the scale multiplier 335. The delay circuit 336 causes an additional value supplied by the adder 332 to be delayed by the delay time D of the same length of time as the clock period of the pixel data. Then, the delay circuit 336 supplies the additional value to the aforementioned scale multiplier 335 and the delay circuit 337 as the delay additional signal $AD_1$, respectively. The scale multiplier 335 multiplies the aforementioned delay additional signal $AD_1$ by the predetermined coefficient $K_1$ (for example, "$7/16$") and then supplies the result to the aforementioned adder 332. The delay circuit 337 causes further the aforementioned delay additional signal $AD_1$ to be delayed by the time (equal to one horizontal scan period—the aforementioned delay time D×4) and then supplies the result to a delay circuit 338 as the delay additional signal $AD_2$. The delay circuit 338 causes further the delay additional signal $AD_2$ to be delayed by the aforementioned delay time D and then supplies the resultant to a scale multiplier 339 as the delay additional signal $AD_3$. Moreover, the delay circuit 338 causes further the delay additional signal $AD_2$ to be delayed by the aforementioned delay time D×2 and then supplies the result to a scale multiplier 340 as the delay additional signal $AD_4$. Still moreover, the delay circuit 338 causes further the delay additional signal $AD_2$ to be delayed by the aforementioned delay time D×3 and then supplies the result to a scale multiplier 341 as the delay additional signal $AD_5$. The scale multiplier 339 multiplies the aforementioned delay additional signal $AD_3$ by the predetermined coefficient $K_2$ (for example, "$3/16$") and then supplies the result to an adder 342. The scale multiplier 340 multiplies the aforementioned delay additional signal $AD_4$ by the predetermined coefficient $K_3$ (for example, "$5/16$") and then supplies the result to the adder 342. The scale multiplier 341 multiplies the aforementioned delay additional signal $AD_5$ by the predetermined coefficient $K_4$ (for example, "$1/16$") and then supplies the result to the adder 342. The adder 342 supplies, to the aforementioned delay circuit 334, the additional signal that has been obtained by adding the results of multiplication supplied by the aforementioned respective scale multipliers 339, 340, and 341. The delay circuit 334 causes such additional signals to be delayed by the aforementioned delay time D and then supplies the resultant signal to the aforementioned adder 332. The adder 332 adds the aforementioned error data (lower two bits of the converted pixel data $HD_P$), the delay output from the delay circuit 334, and the output of multiplication of the scale multiplier 335. In this case, the adder 332 generates the carry-out signal $C_o$ which is equal to logic "0" in absence of carry and logic "1" in the presence of a carry and supplies the signal to an adder 333.

The adder 333 adds the aforementioned display data (upper 6 bits of the converted pixel data $HD_P$) to the aforementioned carry-out signal $C_o$ and outputs the result as 6-bit error diffusion processing pixel data ED.

The operation of the error diffusion processing circuit 330 comprising as such is to be explained below.

Figure 11:
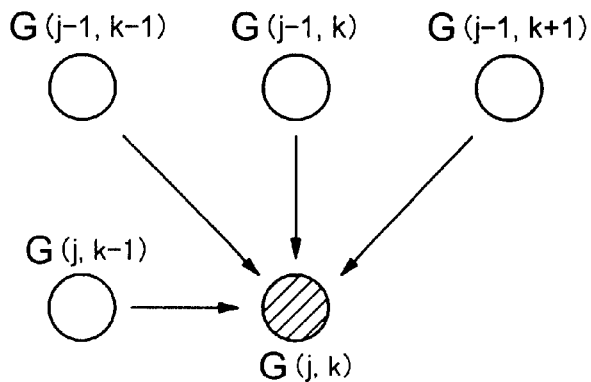
FIG. 11 is a view showing the operation of an error diffusion processing circuit 330.

For example, the error diffusion processing pixel data ED corresponding to pixel G (j, k) of the PDP 10 shown in FIG. 11 is determined. First, the respective error data corresponding to pixel G (j, k−1) on the left of the pixel G (j, k), pixel G (j−1, k−1) on the upper left, pixel G (j−1, k) on the immediate above, and pixel G (j−1, k+1) on the upper right, that is:
Error data corresponding to the pixel G (j, k−1), the additional delay signal $AD_1$;
Error data corresponding to the pixel G (j−1, k+1), the additional delay signal $AD_3$;
Error data corresponding to the pixel G (j−1, k), the additional delay signal $AD_4$; and
Error data corresponding to the pixel G (j−1, k−1), the additional delay signal $AD_5$
are provided, respectively, with weights of the predetermined coefficients $K_1$ to $K_4$ for addition. Subsequently, the result of the addition is added by the error data corresponding to the lower two bits of the converted pixel data $HD_P$, that is, pixel G (j, k). Then, the carry-out signal $C_o$ for one bit thus obtained is added to the display data corresponding to the upper 6 bits of the converted pixel data $HD_P$, that is, the pixel G (j, k) and the resultant are the error diffusion processing pixel data ED.

The error diffusion processing circuit 330 with such a configuration interprets the upper 6 bits of the converted pixel data $HD_P$ as display data, and the remaining lower 2 bits as error data. The circuit also allows for adding the error data of the surrounding pixels {G (j, k−1), G (j−1, k+1), G (j−1, k), G (j−1, k−1)} by assigning weights thereto and the result is to be reflected to the aforementioned display data. This operation allows the brightness of the lower 2 bits at the original pixel {G (j, k)} to be expressed by the aforementioned surrounding pixels in an apparent manner. Therefore, this allows the display data of the number of bits less than 8 bits, that is, equal to 6 bits to express the levels of gray scale of brightness equivalent to those expressed by the aforementioned 8-bit pixel data.

Incidentally, an even addition of these coefficients of error diffusion to respective pixels would cause the noise resulting from error diffusion patterns to be visually noticed and thus produce an adverse effect on display quality. Accordingly, like the case of the dither coefficients-to be described later, the coefficients $K_1$ to $K_4$ for error diffusion that should be assigned to the respective four pixels may be changed at each field.

The dither processing circuit 350 applies the dither processing to the error diffusion processing pixel data ED supplied by the error diffusion processing circuit 330. This allows for generating the multi-level gray scale processing pixel data Ds whose number of bits is reduced further to 4 bits. Meanwhile, the dither processing circuit 350 maintains the level of gray scale of the same brightness as the 6-bit error diffusion processing pixel data ED. Incidentally, the dither processing allows a plurality of adjacent pixels to express one intermediate display level. Take as an example the case of display of a halftone corresponding to 8 bits by using the display data of the upper 6 bits out of an 8-bit pixel data. Four pixels to adjacent to each other at the left and right, and above and below are taken as one set. Four dither coefficients a to d having values different from each other are assigned to respective pixel data corresponding to each of the pixels in the set for addition. The dither processing is to produce four different combinations of intermediate display levels with four pixels. Therefore, even with the number of bits of the pixel data equal to 6 bits, the brightness levels of the gray scale available for display are 4 times, that is, a halftone display corresponding to 8 bits becomes available.

However, an even addition of the dither patterns with the coefficients a to d to respective pixels would cause the noise resulting from the dither patterns to be visually noticed and thus produce an adverse effect of display quality. Accordingly, a dither processing circuit 350 changes the dither coefficients a to d that should be assigned to the respective four pixels at each field.

Figure 12:
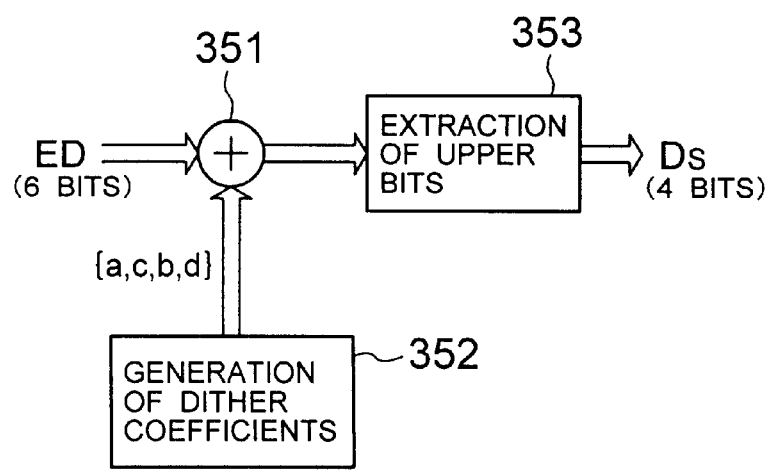
FIG. 12 is a view showing the internal configuration of a dither processing circuit 350.

FIG. 12 is a view showing the internal configuration of the dither processing circuit 350.

Referring to FIG. 12, a dither coefficient generation circuit 352 generates four dither coefficients a, b, c, and d for each of the four pixels adjacent to each other and supplies these coefficients in sequence to the adder 351.

Figure 13:
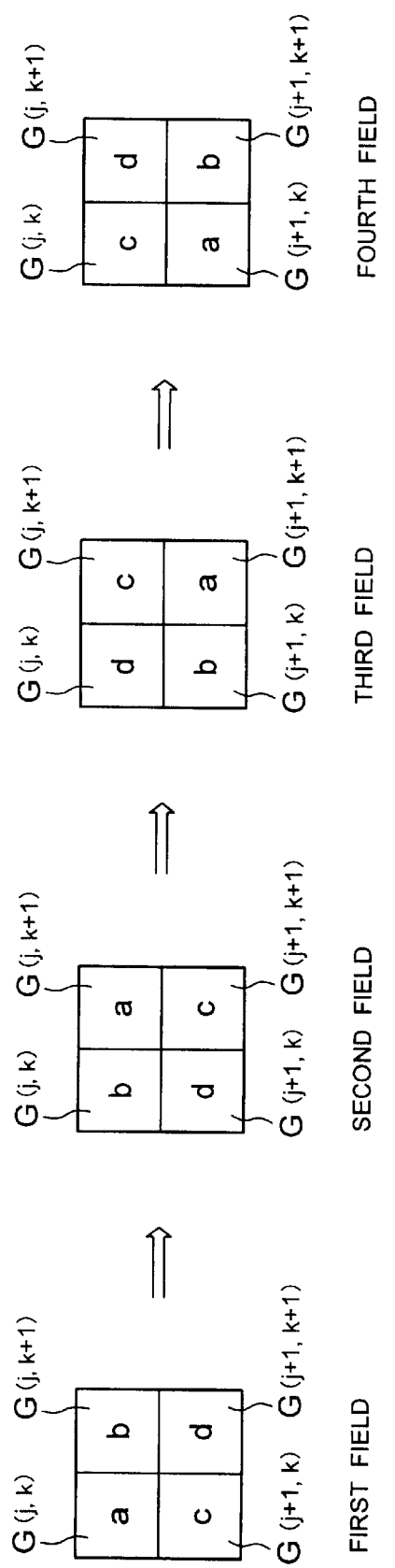
FIG. 13 is a view showing the operation of the dither processing circuit 350.

For example, as shown in FIG. 13, four dither coefficients a, b, c, and d are generated corresponding to four pixels, respectively. The four pixels are pixel G (j, k) and pixel G (j, k+1) corresponding to row j, and pixel G (j+1, k) and pixel G (j+1, k+1) corresponding to row (j+1). At this time, the dither coefficient generation circuit 352 changes, for each field as shown in FIG. 13, the aforementioned dither coefficients a, b, c, and d that should be assigned to the respective four pixels.

That is, dither coefficients a to d are assigned to the pixels at each field and generated repeatedly in a cyclic manner as shown below and supplied to the adder 351.

At the starting first field,
  pixel G (j, k), dither coefficient a,
  pixel G (j, k+1), dither coefficient b,
  pixel G (j+1, k), dither coefficient c, and
  pixel G (j+1, k+1), dither coefficient d;
at the subsequent second field,
  pixel G (j, k), dither coefficient b,
  pixel G (j, k+1), dither coefficient a,
  pixel G (j+1, k), dither coefficient d, and
  pixel G (j+1, k+1), dither coefficient c;
at the subsequent third field,
  pixel G (j, k), dither coefficient d,
  pixel G (j, k+1), dither coefficient c,
  pixel G (j+1, k), dither coefficient b, and
  pixel G (j+1, k+1), dither coefficient a;
and, at the fourth field,
  pixel G (j, k), dither coefficient c,
  pixel G (j, k+1), dither coefficient d,
  pixel G (j+1, k), dither coefficient a, and
  pixel G (j+1, k+1), dither coefficient b;

The dither coefficient generation circuit 352 repeatedly executes the operation of the first to fourth fields mentioned above. That is, upon completion of generating the dither coefficients at the fourth field, the above-mentioned operation is repeated all over again from the aforementioned first field. The adder 351 adds the dither coefficients a to d which are assigned to respective fields as mentioned above to the error diffusion processing pixel data ED, respectively. Hereupon, the error diffusion processing pixel data ED corresponds to the aforementioned pixel G (j, k), pixel G (j, k+1), pixel G (j+1, k), and pixel G (j+1, k+1), respectively, which are supplied by the aforementioned error diffusion processing circuit 330. The adder 351 then supplies the dither additional pixel data thus obtained to the upper bit extracting circuit 353.

For example, at the first field shown in FIG. 13, each of the following data is supplied sequentially as the dither additional pixel data to the upper bit extracting circuit 353. That is,
error diffusion processing pixel data ED corresponding to pixel G (i, k)+dither coefficient a,
error diffusion processing pixel data ED corresponding to pixel G (j, k+1)+dither coefficient b,
error diffusion processing pixel data ED corresponding to pixel G (j+1, k)+dither coefficient c, and
error diffusion processing pixel data ED corresponding to pixel G (j+1, k+1)+dither coefficient d.

The upper bit extracting circuit 353 extracts the bits up to the upper four bits of the dither additional pixel data for output as multi-level gray scale pixel data $D_S$.

As mentioned above, the dither processing circuit 350 shown in FIG. 12 changes the aforementioned dither coefficients a to d that should be associated with and assigned to each of the four pixels. This allows for determining the multi-level gray-scale pixel data $D_S$ of 4 bits (0 to 7) having a visually multi-level gray scale while reducing visual noise caused by dither patterns, which is then supplied to the second data converter 34.

The second data converter 34 converts the multi-level gray-scale pixel data $D_S$ into the converted pixel data (display pixel data) HD of bits 1 to 8 corresponding to respective sub-fields SF1 to SF8 in accordance with the conversion table shown in FIG. 14. Incidentally, in FIG. 14, the bits with logic level "1" among the bits 1 to 8 of the converted pixel data HD indicate the selective erase discharge to be carried out in the pixel data writing step Wc at the sub-fields SF corresponding to the bits (indicated by black circles).

In the foregoing, the aforementioned converted pixel data HD is supplied to the address driver 6 via the memory 4 as shown in FIG. 3. At this time, the format of the converted pixel data HD is to take one of the 9 patterns shown in FIG. 14. The address driver 6 assigns each of bits 1 to 8 in the aforementioned converted pixel data HD to the respective sub-fields SF1 to SF8. Then, only when the bit logic is logic level "1", the address driver 6 generates a high-tension pixel data pulse at the pixel data writing step Wc in the associated sub-field and supplies the pulse to the column electrodes D of the PDP 10. This allows for generating the aforementioned selective erase discharge. This allows each of the discharge cells to become a light-emitting cell for a period until the aforementioned selective erase discharge is carried out in the sub-fields indicated by the black circles of FIG. 19. Thus, each discharge cell emits light at light-emission period ratio shown in FIGS. 5A and 5B in each sustaining light-emission process Ic of each of the successive sub-fields which are present during the period.

This allows for carrying out the light-emission drive with the following 9 levels of halftone during an even field (frame) display period as shown by the light-emission brightness $L_A$ of FIG. 14. That is,

{0: 3: 14: 34: 64: 104: 155: 218: 255}.

This also allows for carrying out the light-emission drive with the following 9 levels of halftone during an odd field (frame) display period as shown by the light-emission brightness $L_B$ of FIG. 19. That is,

{0: 1: 7: 23: 47: 82: 128: 185: 255}.

FIG. 15A through FIG. 15J are views showing the display operations of the frames A, B, C, D, . . . of the film in the display device of FIG. 3.

FIG. 15A through FIG. 15G are the same as those shown in FIG. 2A through FIG. 2G. That is, the video signals using an interlaced scanning system 2–3 telecine-converted for the frames A, B, C, D, . . . of the film shown in FIG. 15A are field columns A1, A2, B1, . . . . . D1, D2, . . . as shown in FIG. 15B. In the field columns, the video signals VA, VB, VC, VD . . . using the line sequential scanning shown in FIG. 15C by the sequential scan converter 14 are obtained. The respective video signals VA, VB, VC, VD . . . , after thinned out sequentially, are written in the memories 16, 17 as shown in FIGS. 15D and 15E alternately. The video signals VA, VB, VC, VD, . . . thinned out and written in the memories 16, 17 are read by the control of the memory control circuit 19. The reading is repeated twice at 48 HZ from the memories 16, 17, respectively. In the reading from the memory 16, the video signals VA, VA, VC, VC, . . . are obtained as shown in FIG. 15F, and in the reading from the memory 17, the video signals VB, VB, VD, VD . . . are obtained as shown in FIG. 15G.

The video signal outputted from the change-over switch 18, namely, the pixel data PD' are VA, VA, VB, VB, VC, VC, VD, VD, . . . as shown in FIG. 15H. In the first data converter 32, the fields (even fields) VA', VB', VD', VD', . . . where the drive mode (A) by the conversion characteristics of FIG. 8 is set, and the fields (odd fields) VA", VB", VD", VD" . . . where the drive mode (B) by the conversion characteristics of FIG. 9 is set are outputted alternately as a conversion pixel data $HD_P$ as shown in FIG. 15I.

In the display on PDP 10, the first light-emission drive sequence by the drive mode (A) of 1/48 sec. as shown in FIG. 15J and the second light-emission drive sequence by the drive mode (B) of 1/48 sec. are made alternately for each field. As a result, one screen display is made in 1/24 sec. like the frame of the movie film shown in FIG. 15A.

In this embodiment, two different light-emission drive sequences are set with the reproduction of frame rate of 2×, however, n (e.g. three) different light-emission drive sequences may be set with the reproduction of frame rate of n× (e.g. 3×).

According to the present invention, one screen display can be achieved in 1/24 sec. like the frame of the movie film, thereby improving display quality for the telecine-converted picture.

This application is based on a Japanese Application No. 2000–168068 which is hereby incorporated by reference.

What is claimed is:

1. A display device, comprising:

a detector for detecting whether or not an input video signal of interlaced scanning is a telecine-converted video signal by unit of field obtained by telecine-converting a film source which has 24 frames per second;

a line sequential scan convertor for converting said inputted video signal of interlaced scanning into a video signal of line sequential scanning by field-to-field interpolation processing using fields of the same film frame if said detector determines that said input video signal of interlaced scanning is a telecine-converted video signal;

a memory;

a memory controller of thinning out the video signal of line sequential scanning converted by said line sequential scan convertor to write it into said memory by unit of field, and repeatedly reading the video signal of line sequential scanning written into said memory by n times from said memory at a rate of n times (n: an integer of 2 or more) as large as 24 Hz; and a driving device for driving a display panel with the video signal of line sequential scanning read from said memory.

2. The display device according to claim 1, wherein said driving device divides a light-emitting period corresponding to one field into a plurality of sub-fields, sets pixel cells to a state of either of light-emitting cells or non-light-emitting cells in accordance with the video signal of line sequential scanning read from said memory in each of the plurality of sub-fields, and sets light-emission drive sequences allowing only said light-emitting cells to emit light by the number of times corresponding to weighting of each of the plurality of sub-fields, and each of said light-emission drive sequences for the video signal of line sequential scanning for one field repeatedly read by n times is composed of light-emission drive sequences for n times whose number of light-emitting times in each of the plurality of sub-fields is different from each other.

3. The display device according to claim 1, wherein said display panel is a plasma display panel.

* * * * *